Patented May 21, 1929.

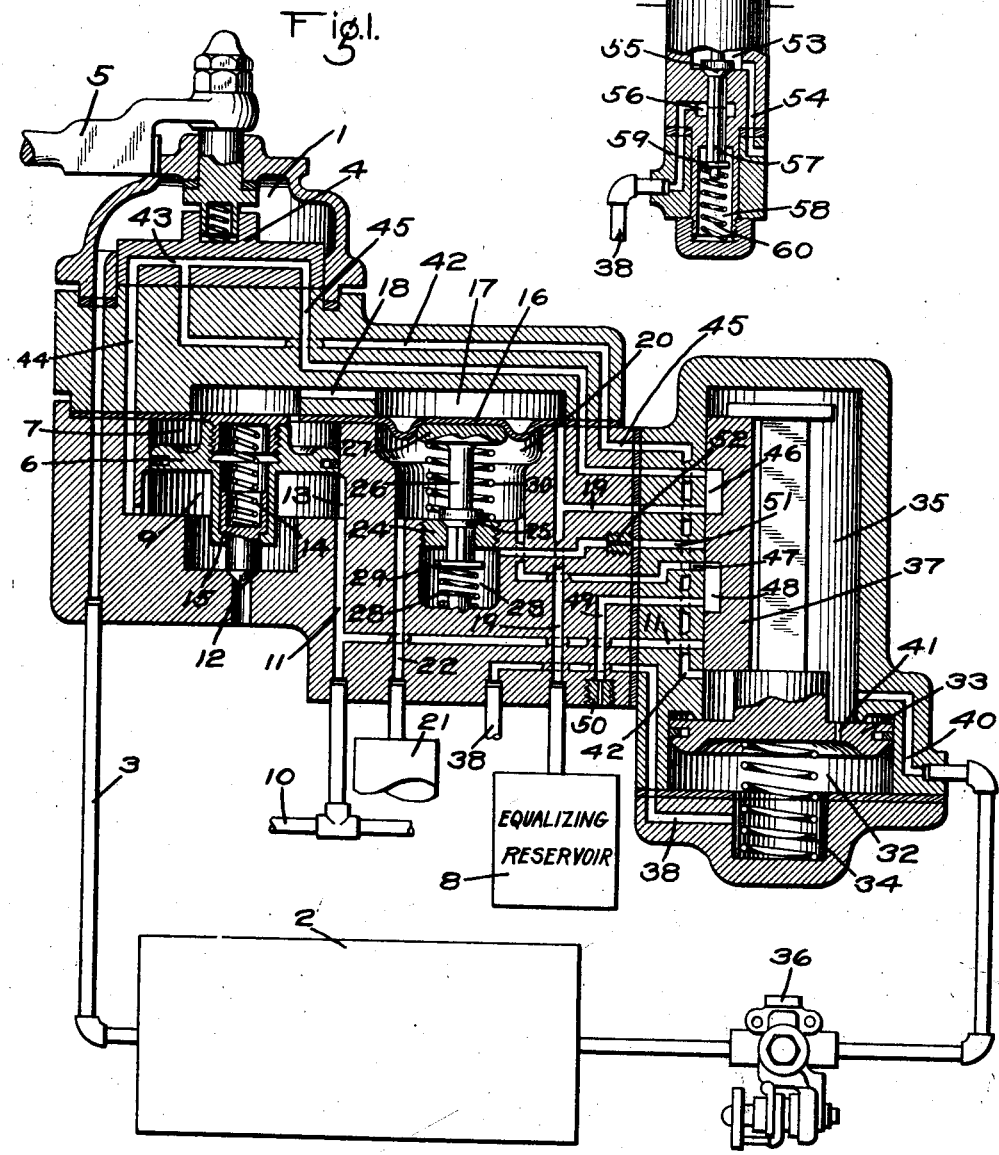

1,714,055

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPLIT REDUCTION DEVICE.

Application filed June 18, 1927. Serial No. 199,675.

This invention relates to fluid pressure brakes and more particularly to a locomotive brake equipment, of the type having means for automatically controlling the application of train brakes.

In operating railway trains, it is the usual practice for the engineer, in effecting an application of the brakes, to manipulate the brake valve device in such a manner as to first make a light brake pipe reduction, to insure the application of all brakes on the train, in such a manner, that the slack between the cars of the train will not be permitted to run in harshly. After the slack has thus been gathered, the engineer again manipulates the brake valve device to effect a heavier brake pipe reduction sufficient to produce the desired application of the brakes.

It has also heretofore been proposed to automatically effect a brake pipe reduction in two stages, such that the initial stage will be sufficient to cause a gentle gathering of the train slack and then the second stage of the brake pipe reduction is started.

According to my invention, I propose to provide means adapted to automatically effect a brake pipe reduction at two different rates, instead of in two separate stages. The initial rate of brake pipe reduction being made at a slow rate and being adapted to cause a gentle gathering of the train slack and then after the slack is thus gathered, the rate of brake pipe reduction is automatically increased to a faster rate, which is adapted to apply the brakes with the desired force.

Other objects and advantages will appear in the following more detailed description of my invention.

In the accompanying drawing, Fig. 1 is a diagrammatic sectional view of a fluid pressure brake apparatus embodying my invention; and Fig. 2 a sectional view of the controlling magnet.

As shown in the drawing, the apparatus may comprise a brake valve device, an application valve device, a brake pipe reduction control valve device and a magnet valve device.

The brake valve device comprises the usual rotary valve 4 contained in a valve chamber 1 and adapted to be operated by a handle 5. Associated with the brake valve device is the usual discharge valve mechanism comprising an equalizing piston 6, forming, at one side, a chamber 7, connected with an equalizing reservoir 8, in a manner hereinafter more fully described, and at the opposite side a chamber 9 connected to the usual brake pipe 10, through passage and pipe 11, said piston being adapted to operate a brake pipe discharge valve 12.

The equalizing piston device is of the collapsible type, the piston 6, thereof, being loosely connected with the discharge valve 12, so as to permit relative downward movement of the equalizing piston after the discharge valve 12 is seated and in the extreme downward position of the equalizing piston, communication is opened between the chambers 7 and 9, through equalizing grooves 13, provided in the wall of the chamber 9. In order to permit movement of the equalizing piston 6, relative to the discharge valve 12, the equalizing piston 6 is provided with a projection having a chamber, in which the inner end portion of the discharge valve 12 is loosely mounted and containing a spring 14, adapted to yieldingly maintain the equalizing piston 6 and discharge valve 12 in their normal relative positions, as shown in the drawing, a shoulder 15 being provided on the inner end portion of the discharge valve 12 for engaging a corresponding shoulder in the chambered projection to limit upward movement of the equalizing piston.

The application valve device comprises a piston 33, contained in a chamber 32 and subject to the pressure of a spring 34 also contained in said chamber, and a slide valve 37 contained in a valve chamber 35 and adapted to be operated by the piston 33.

The brake pipe reduction control valve device comprises a diaphragm 16, forming a chamber 17 at one side, said chamber being connected by passage 18 to the equalizing piston chamber 7 and by passage 19 to the equalizing reservoir 8. At the opposite side of the diaphragm 16, a chamber 20 is formed, which chamber is connected to a reduction limiting reservoir 21 by a passage and pipe 22.

A valve 25 is contained in chamber 20 and is adapted to be operated by a stem 26, depending from the follower plate 27 of the diaphragm 16. Said valve has a fluted stem, extending through a plug 24, having screw-threaded engagement in the casing, and terminating in a chamber 23, wherein a spring 28, acting upon a thrust washer 29, opposes the seating of said valve. Interposed between the diaphragm follower plate 27 and the plug 24 is a coil spring 30.

The magnet valve device comprises a casing containing a magnet and having a chamber 53, connected to the atmosphere through a passage 54 and containing a valve 55. Said valve has a fluted stem, which extends through the casing wall into a chamber 56, said chamber being connected to the application piston chamber 32, through passage and pipe 38. The fluted stem of the valve 55 is engaged in chamber 56, by a fluted stem 57, which extends through the casing wall into a chamber 58 and has formed at its lower end a collar 59. A spring 60, contained in the chamber 58, engages the stem collar 59 and is adapted to unseat the valve 55.

In operation, fluid under pressure from the main reservoir 2 is supplied through pipe and passage 3 to the rotary valve chamber 1 and to feed valve device 36, which is adapted to supply fluid, at the reduced pressure carried in the brake pipe, to the application valve chamber 35 by way of passage and pipe 40. Fluid under pressure from this valve chamber 35 then flows through port 41 in the piston 33 into the piston chamber 32 and from thence through the passage and pipe 38 to chamber 56 of the magnet valve device.

By means of apparatus which need not here be described, the magnet is energized when the signal condition is favorable or when the speed of the train is within a predetermined speed limit. With the magnet energized, the magnet valve 55 is held seated against the pressure of spring 60, and the fluid in chamber 56 and application piston chamber 32 equalizes with the pressure in the application valve chamber 35, so that the pressure of spring 34 then holds the application piston 33 and slide valve 37 in the inner or release position, as shown in the drawing.

With the application valve device in release position, fluid at feed valve pressure from the valve chamber 35 flows to the brake pipe 10 through passage 42, port 43 in the rotary valve 4, passage 44, equalizing piston chamber 9 and passage 11. Fluid at feed valve pressure is also supplied to the equalizing reservoir 8 through port 43 in the rotary valve, by way of passage 45, cavity 46 in the slide valve 37 and passage 19 and from passage 19 to the diaphragm chamber 17 and through passage 18 to the equalizing piston chamber 7.

With the slide valve 37 in release position, the reduction limiting reservoir 21 is vented to the atmosphere by way of passage 22, diaphram chamber 20, passage 47, cavity 48 in the slide valve 37, passage 49 and through a choke plug 50.

With the diaphragm chamber 20 at atmospheric pressure and the chamber 17 at the pressure in the equalizing reservoir, the diaphragm 16 is operated to hold valve 25 seated.

If the track conditions become unfavorable, the magnet will be deenergized and the valve 55 opened, so that fluid is vented from the piston chamber 32 of the application valve device to the atmosphere through passage and pipe 38 and the pressure of the fluid in the valve chamber 35 then shifts the application piston 33 and slide valve 37 to their outer position, in which position the slide valve laps passage 42, thereby preventing further flow of fluid under pressure to the brake pipe 10. In this position of the slide valve 37, cavity 48 connects the brake pipe 10 to the atmosphere, by way of passages 11 and 49 and choke plug 50, so that the brake pipe pressure is permitted to gradually reduce at a rate permitted by the choke plug 50 and as a result, a gradual application of the brakes is effected. Further, in this position of the slide valve 37, cavity 46 connects passage 19 to passage 51, so that fluid under pressure from the equalizing reservoir 8 is permitted to flow to the chamber 23. Since the relative volume of chamber 23 is very small, no appreciable decrease in equalizing reservoir pressure is thus effected.

As the brake pipe pressure is reduced, as above described, the pressure in the chamber 9, at one side of the equalizing piston 6 of the brake valve device reduces correspondingly, and since the equalizing reservoir pressure, effective in the equalizing piston chamber 7, is not being reduced, it acts on the piston 6 to move it to a position, in which the equalizing ports 13 connect the two chambers 7 and 9, so that, the pressure of the fluid in the equalizing reservoir 8 is permitted to drop as the brake pipe pressure is reduced.

When the pressure of fluid in the equalizing reservoir and in chamber 17 has been reduced to a degree slightly less than the pressure of the spring 30, the diaphragm 16 will be moved, so as to unseat the valve 25 and thus connect the chambers 23 and 20. Fluid under pressure in the equalizing reservoir 8 and in the equalizing piston chamber 7, then flows to the reduction limiting reservoir 21, at a predetermined rate, controlled by the size of the opening through the choke plug 52, until the pressures in said reservoirs are equal.

Since the brake pipe pressure is not permitted to reduce through the opening in the choke plug 50, as fast as the pressure reduces in the equalizing piston chamber 7, said brake pipe pressure shifts the equalizing piston 6 upwardly, which opens the discharge valve 12 and permits fluid under pressure in the brake pipe 10 to flow through a port to the atmosphere at a high rate, thereby causing the train brakes to be quickly applied.

The combined flow area of choke plug 50 and the discharge port controlled by the discharge valve 12, is preferably such as to permit substantially the same rate of reduction in brake pipe pressure as is obtained in effecting a service application of brakes, in the usual manner.

The reduction limiting reservoir 21 is employed to limit the degree of drop in equalizing reservoir pressure to that necessary for a full service brake application. When the brake pipe pressure in the equalizing piston chamber 9 becomes slightly less than the reduced equalizing reservoir pressure in piston chamber 7, the piston 6 operates to seat the discharge valve 12 and prevent further flow of fluid under pressure from the brake pipe to the atmosphere.

The time required for effecting a degree of brake pipe reduction such that the ensuing brake application will be sufficient to gather the slack in a train, varies as the train length varies and since, according to my invention, the start of brake pipe reduction, at a faster rate, is dependent upon a predetermined drop in brake pipe pressure, said faster rate of brake pipe reduction will automatically be started at the desired time. In the case of leakage of fluid under pressure from the brake pipe to the atmosphere, it will be noted, that as the degree of said leakage increases, it obviously increases the rate at which the initial reduction in brake pipe pressure is effected, with the result, that the brake pipe reduction at the faster rate will be started sooner, after the start of the initial reduction, the period of time being proportionate to the degree of brake pipe leakage.

Having now described my invention, what I claim as new and desire to secure by Letters Patent, is:—

1. In a fluid pressure brake, the combination with a brake pipe, of means for automatically effecting a continuous reduction in brake pipe pressure at a varying rate regardless of the length of the train.

2. In a fluid pressure brake, the combination with a brake pipe, of means for automatically effecting a continuous reduction in brake pipe pressure varying from a predetermined slow rate to a faster rate regardless of the length of the train.

3. In a fluid pressure brake, the combination with a brake pipe, of means for automatically effecting a reduction in brake pipe pressure at different rates, regardless of the length of the train, said reductions at differing rates being continuous one with the other.

4. In a fluid pressure brake, the combination with a brake pipe, of means for reducing the pressure of fluid in said brake pipe at a predetermined rate, and means subject to the reduced pressure of fluid in said brake pipe for accelerating the rate of said reduction.

5. In a fluid pressure brake, the combination with a brake pipe, of means for reducing the pressure of fluid in said brake pipe at a predetermined rate, and means subject to the reduced pressure of fluid in said brake pipe for continuing the brake pipe reduction at a different rate.

6. In a fluid pressure brake, the combination with a brake pipe, of means for reducing the pressure of fluid in said brake pipe at a predetermined slow rate, and means subject to the reduced pressure of fluid in said brake pipe for continuing the reduction in brake pipe pressure at a faster rate.

7. In a fluid pressure brake, the combination with a brake pipe, of means for venting fluid from said brake pipe to the atmosphere at a predetermined rate for a period of time governed by the length of the train, and means for accelerating the rate of said reduction at the end of said period of time.

8. In a fluid pressure brake, the combination with a brake pipe, of means for venting fluid from said brake pipe to the atmosphere at a predetermined rate for a period of time governed by the length of the train, and means for additionally venting fluid from said brake pipe to the atmosphere to accelerate the rate of said reduction at the end of said period of time.

9. In a fluid pressure brake, the combination with a brake pipe, of means for effecting a reduction in brake pipe pressure at a predetermined slow rate, and means controlled by the reduced brake pipe pressure for accelerating the rate of said reduction.

10. In a fluid pressure brake, the combination with a brake pipe and means for effecting a reduction in brake pipe pressure at a predetermined rate, of a valve device having a chamber normally charged with fluid under pressure, and a valve device associated with the first mentioned valve device and subject to the opposing pressures of said chamber and the brake pipe for accelerating the rate of reduction of the brake pipe pressure.

11. In a fluid pressure brake, the combination with a brake pipe and means for effecting a reduction in brake pipe pressure at a predetermined rate, of an equalizing reservoir normally charged with fluid under pressure, means operated upon a predetermined reduction in brake pipe pressure for effecting a reduction in the equalizing reservoir pressure, and means operable upon a predetermined reduction in the equalizing reservoir pressure for accelerating the rate of reduction of the brake pipe pressure.

12. In a fluid pressure brake, the combination with a brake pipe and means for effecting a reduction in brake pipe pressure at a predetermined rate, of an equalizing reservoir normally charged with fluid under pressure, means operated upon a predetermined reduction in brake pipe pressure for effecting a reduction in the equalizing reservoir pressure, and means operable by the reduced brake pipe pressure upon a predetermined reduction in the equalizing reservoir pressure for accelerating the rate of reduction of the brake pipe pressure.

13. In a fluid pressure brake, the combination with brake pipe, of means for effecting a reduction in brake pipe pressure at a slow rate, a plurality of valve devices adapted to cooperate with each other upon a predetermined brake pipe reduction for accelerating the rate of the brake pipe reduction.

14. In a fluid pressure brake, the combination with a brake pipe and an equalizing reservoir normally charged with fluid under pressure, of means for effecting a reduction in the pressure of fluid in said brake pipe at a predetermined rate, a piston valve device operable upon a predetermined reduction in brake pipe pressure for effecting a reduction in the equalizing reservoir pressure, valve means normally maintained inoperative by the fluid under equalizing reservoir pressure and adapted to operate upon a predetermined reduction in equalizing reservoir pressure for further reducing said equalizing reservoir pressure to permit the fluid at the reduced brake pipe pressure to operate said piston valve device for accelerating the rate of reduction of the brake pipe pressure.

15. In a fluid pressure brake, the combination with a brake pipe and an equalizing reservoir normally charged with fluid under pressure, of means for effecting a reduction in the pressure of fluid in said brake pipe at a predetermined rate, piston means operable upon a reduction in brake pipe pressure for effecting an initial reduction in the equalizing reservoir pressure, means operable upon said initial reduction in equalizing reservoir pressure for reducing said equalizing reservoir pressure further to a degree lower than that of the reduced brake pipe pressure to permit said piston means to be operated to accelerate the rate of reduction of the brake pipe pressure.

16. In a fluid pressure brake, the combination with a brake pipe and an equalizing reservoir normally charged with fluid under pressure, of means for effecting a reduction in the pressure of fluid in said brake pipe at a predetermined rate, piston means operable upon a reduction in brake pipe pressure for effecting an initial reduction in the equalizing reservoir pressure, means operable upon said initial reduction in equalizing reservoir pressure for reducing said equalizing reservoir pressure further to a degree lower than that of the reduced brake pipe pressure to permit said piston means to be operated by the fluid at reduced brake pipe pressure to accelerate the rate of reduction of the brake pipe pressure.

17. In a fluid pressure brake, the combination with a brake pipe and an equalizing reservoir normally charged with fluid under pressure, of means for effecting a reduction in the pressure of fluid in said brake pipe at a predetermined rate, piston means operable upon a reduction in brake pipe pressure for effecting an initial reduction in the equalizing reservoir pressure at a rate substantially the same as the reduction in the brake pipe pressure, means operable upon said reduction in equalizing reservoir pressure for accelerating the rate of reduction of said equalizing reservoir pressure for permitting said piston means to operate to accelerate the rate of reduction of the brake pipe pressure.

18. In a fluid pressure brake, the combination with a brake pipe and means for effecting a reduction in brake pipe pressure at a predetermined rate, of two reservoirs, and means operable upon a predetermined reduction in brake pipe pressure for venting fluid under pressure from one of said reservoirs into the other of said reservoirs to accelerate the rate of reduction in brake pipe pressure.

19. In a fluid pressure brake, the combination with a brake pipe and means for effecting a reduction in brake pipe pressure at a predetermined rate, of two reservoirs one of which is normally charged with fluid under pressure, means operable upon a predetermined reduction in brake pipe pressure for venting fluid from the charged reservoir into the other of said reservoirs and means operable upon the venting of said reservoir for accelerating the rate of reduction of brake pipe pressure.

20. In a fluid pressure brake, the combination with a brake pipe and means for effecting a reduction in brake pipe pressure at a predetermined rate, of two reservoirs one of which is normally charged with a fluid under pressure, means operable upon a predetermined reduction in brake pipe pressure for venting fluid from the charged reservoir into the other of said reservoirs and means operable by fluid at reduced brake pipe pressure upon the venting of said reservoir for accelerating the rate of reduction of brake pipe pressure.

21. In a fluid pressure brake, the combination with a brake pipe and means for effecting a reduction in brake pipe pressure at a predetermined rate, of a piston valve device comprising a piston and a valve member loosely connected together, said piston, upon said reduction in brake pipe pressure, being movable relative to said valve member by fluid under pressure, and means for reducing the pressure of the fluid moving said piston, said piston, upon the reduction of the pressure of the fluid moving it, being movable by the reduced brake pipe pressure to operate said valve member to accelerate the rate of brake pipe reduction.

22. In a fluid pressure brake, the combination with a brake pipe having two vents normally closed to the atmosphere, one of which has a greater flow area than the other, a valve device operable to open the vent having the lesser flow area for venting fluid under pressure from the brake pipe to the atmosphere, and means controlled by said valve device whereby a predetermined reduction in brake pipe pressure will cause the vent having the larger flow area to be opened to additionally vent fluid under pressure from the brake pipe to the atmosphere.

23. In a fluid pressure brake, the combination with a brake pipe having two vents normally closed to the atmosphere, one of which has a greater flow area than the other, a valve device operable to open the vent having the lesser flow area for venting fluid under pressure from the brake pipe to the atmosphere, and means whereby a predetermined reduction in brake pipe pressure will cause fluid under pressure from said brake pipe to be additionally vented to the atmosphere through the other of said vents.

24. In a fluid pressure brake, the combination with a fluid supply means and a brake pipe of a control valve device having a piston chamber normally charged with fluid under pressure from said supply means, means whereby a reduction in the pressure of the fluid in said piston chamber will initiate a reduction in the pressure of the fluid in said brake pipe, means for restricting said brake pipe reduction to a slow rate, and means operable upon a predetermined reduction in brake pipe pressure for accelerating the rate of said reduction in brake pipe pressure.

25. In a fluid pressure brake, the combination with a brake pipe, of a control valve device normally charged with fluid under pressure and operable upon a reduction in said pressure for initiating a reduction in the pressure of fluid in said brake pipe at a restricted rate, and means for accelerating the rate of reduction in the brake pipe pressure when said brake pipe pressure has been reduced to a predetermined degree.

26. In a fluid pressure brake, the method of effecting a continuous reduction in brake pipe pressure to apply the brakes consisting in first automatically venting fluid under pressure from the brake pipe to the atmosphere at a predetermined rate for a period of time and then at the end of said period, automatically increasing the rate of the venting of fluid under pressure from the brake pipe to the atmosphere.

27. In a fluid pressure brake, the method of effecting a continuous reduction in brake pipe pressure consisting in first automatically reducing the brake pipe pressure at a rate governed by the flow area of a passage leading to the atmosphere for a period of time governed by the length of the train, and then automatically reducing the brake pipe pressure at a different rate.

28. In a fluid pressure brake, the method of effecting a continuous reduction in brake pipe pressure consisting in first automatically reducing the pressure of fluid in a control valve device causing said device to operate to vent said brake pipe to the atmosphere through a restricted passage and then after a period of time permitting the fluid at reduced brake pipe pressure to operate means to additionally vent said brake pipe to the atmosphere.

29. In a fluid pressure brake, the combination with a brake pipe and a normally charged reservoir, of means for initially venting fluid from the brake pipe at a predetermined rate, means operated upon a predetermined reduction in pressure in said reservoir for also effecting a venting of fluid from the brake pipe, and means for reducing the pressure in said reservoir.

30. In a fluid pressure brake, the combination with a brake pipe and a normally charged reservoir, of means for initially venting fluid from the brake pipe at a predetermined rate, means operated upon a predetermined reduction in pressure in said reservoir for also effecting a venting of fluid from the brake pipe, and means for reducing the pressure in said reservoir at a rate substantially proportional to the rate at which the brake pipe pressure is initally reduced.

31. In a fluid pressure brake, the combination with a brake pipe and a normally charged reservoir, of means for initially venting fluid from the brake pipe at a predetermined rate, means operated upon a predetermined reduction in pressure in said reservoir for also effecting a venting of fluid from the brake pipe, and means operated upon initially reducing the brake pipe pressure for opening communication from said reservoir to the brake pipe.

In testimony whereof I have hereunto set my hand.

THOMAS H. THOMAS.